(12) United States Patent
Yamasaki et al.

(10) Patent No.: US 6,854,851 B2
(45) Date of Patent: Feb. 15, 2005

(54) PROJECTION DISPLAY

(75) Inventors: Futoshi Yamasaki, Yokohama (JP);
Satoshi Nakayama, Yokohama (JP);
Takuya Shiaki, Sagamihara (JP);
Tsutomu Nakashima, Yokohama (JP);
Eiji Yamaguchi, Yokohama (JP);
Nobuyuki Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/651,242

(22) Filed: Aug. 29, 2003

(65) Prior Publication Data

US 2004/0080722 A1 Apr. 29, 2004

(30) Foreign Application Priority Data

Sep. 6, 2002 (JP) ......................................... 2002-261633
Jun. 17, 2003 (JP) ......................................... 2003-171474

(51) Int. Cl.[7] .......................... G03B 21/16; G03B 21/28; H04N 9/31; G02B 26/02; G02F 1/1333
(52) U.S. Cl. .............................. 353/97; 353/20; 353/37; 353/38; 353/60; 353/99; 353/102; 348/744; 359/233; 349/7
(58) Field of Search .............................. 353/97, 31, 84, 353/98, 99, 20, 34, 37, 52, 57, 60, 32, 38, 102; 345/88, 31, 83; 351/243; 359/456, 457, 233, 738–740; 348/54, 744, 254, 51, 674; 349/5, 7

(56) References Cited

U.S. PATENT DOCUMENTS 5,519,518 A * 5/1996 Watanabe et al. ............. 359/40

FOREIGN PATENT DOCUMENTS

| JP | 3-111806 | 5/1991 |
| JP | 4-63318 | 2/1992 |
| JP | 6-342158 | 12/1994 |
| JP | 2001-222002 | 8/2001 |

* cited by examiner

Primary Examiner—Judy Nguyen
Assistant Examiner—Rochelle Blackman
(74) Attorney, Agent, or Firm—McDermott Will & Emery LLP (57) ABSTRACT

A projection display according to the present invention reduces the size of a light beam in the optical path of an illumination optics from the periphery to change the amount of light incident on a video display device and the angle of such incidence, thereby making a plurality of image brightness/contrast combinations selectable. Further, the present invention changes the revolving speed of a projection display cooling fan and the adjustment value settings for the video display device's electrical characteristics in accordance with the aperture.

19 Claims, 9 Drawing Sheets

PROJECTION DISPLAY

BACKGROUND OF THE INVENTION

It has been demanded that LCD projectors and other projection displays have a small structure and offer high brightness, high contrast, and other favorable performance characteristics.

A conventional technology for brightness enhancement is disclosed, for instance, by Japanese Patent Laid-open No. H4-63318. When an LCD panel is used as a video display device, this technology uses a polarizing beam splitter to separate a random polarized light emission from a light source into p-polarized light and s-polarized light, and projects them onto the LCD panel with their polarization directions aligned. A conventional technology for contrast enhancement is disclosed, for instance, by Japanese Patent Laid-open No. H6-342158. This technology uses a lens having a concave conical surface and converts light rays, which come from a reflector and have a great incidence angle, into parallel rays. A conventional technology for screen brightness uniformity enhancement is disclosed, for instance, by Japanese Patent Laid-open No. H3-111806. This technology describes an integrator optical system, which uses two array lenses.

SUMMARY OF THE INVENTION

Figure 12:
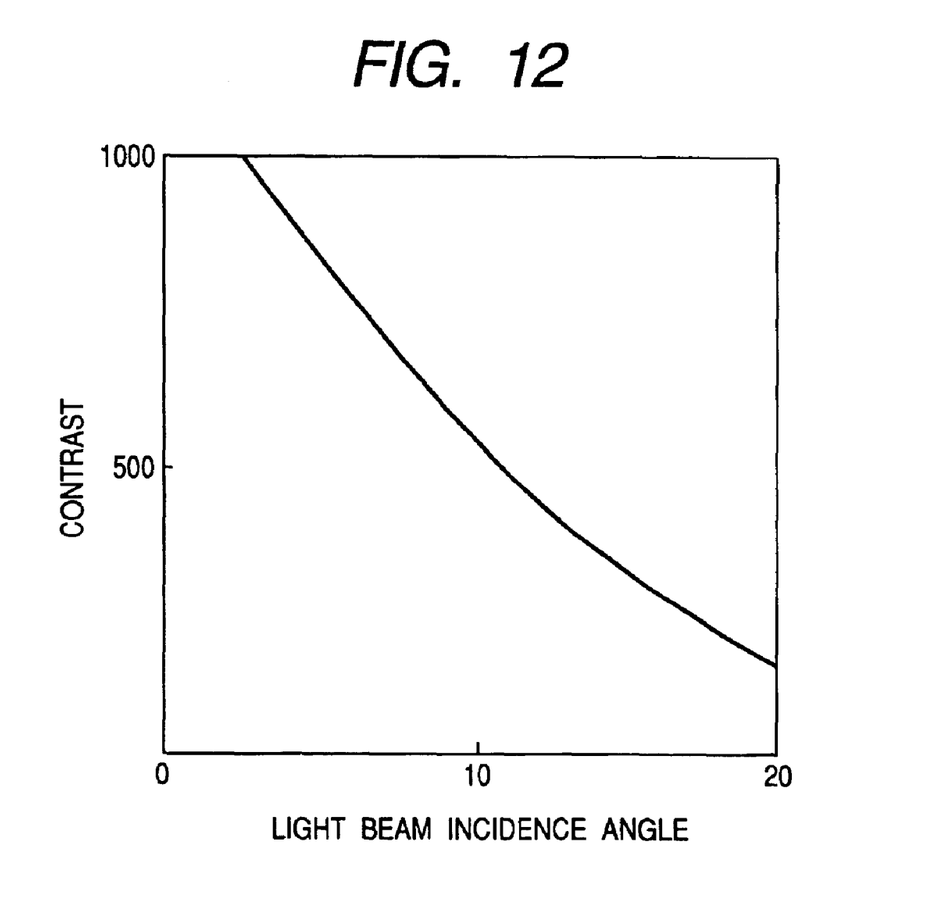
FIG. 12 is a graph illustrating how the contrast of a video display device varies with the angle of light beam incidence.

In general, a video display device such as an LCD panel exhibits good contrast characteristics when incident light rays are approximately parallel to each other. However, if the angle of light beam incidence (hereinafter may be referred to as the light beam incidence angle) increases, the contrast of a projected image lowers due to the dependence of the LCD panel or other video display device on the incidence angle. FIG. 12 shows the results of an experiment that was conducted to determine how the contrast value varies with the light beam incidence angle. The smaller the angle of light beam incidence on the LCD panel, the higher the contrast. It is therefore desirable that the angle of light beam incidence on the LCD panel or video display device be reduced for contrast enhancement purposes. However, if the amount of light falling on the LCD panel or other video display device is increased for brightness enhancement purposes, the angle of light beam incidence on the video display device generally increases, thereby lowering the contrast. To enhance both the brightness and contrast, it is necessary to reduce the light beam incidence angle without decreasing the amount of light falling on the LCD panel or other video display device. The above-mentioned technology disclosed by Japanese Patent Laid-open No. H6-342158, for example, may increase the size of the display because it requires the use of a lens having substantially the same diameter as the reflector opening and a great dimension in the direction of the optical axis.

In consideration of the conventional technologies described above, it is an object of the present invention to provide a projection display that is capable of adapting itself as needed to bright, dark, and various other operating environments.

To achieve the above object, the present invention includes a light source unit which comprises a light source and a reflector, an illumination optics unit for converting a light beam emission from the light source unit into approximately parallel light rays, a video display device for generating an optical image by modulating the light beam emission from the illumination optics unit in accordance with a video signal, a projection unit for projecting image light which is received from the video display device, and a variable aperture having at least a first state in which the light beam emission is blocked in accordance with the visibility angle characteristic of the video display device and a second state in which the aperture is maximized. The present invention also uses the variable aperture so as to make a plurality of image brightness/contrast combinations selectable.

As described above, the present invention enables a projection display to vary the brightness and contrast as appropriate for bright, dark, and various other operating environments.

DETAILED DESCRIPTION OF PREFERRED EMBODIMENTS

Embodiments of the present invention will now be described with reference to the accompanying drawings.

In a first embodiment, a variable aperture, which opens bidirectionally to block a light beam path, is installed between a first array lens and a second array lens. This variable aperture comprises a door-shaped light shield, which revolves around a support axis, suffers positional displacement, and opens in the direction of the optical axis. Further, the revolving speed of a cooling fan varies in accordance with the light beam size, which is adjusted by opening/closing the light shield.

Figure 1:
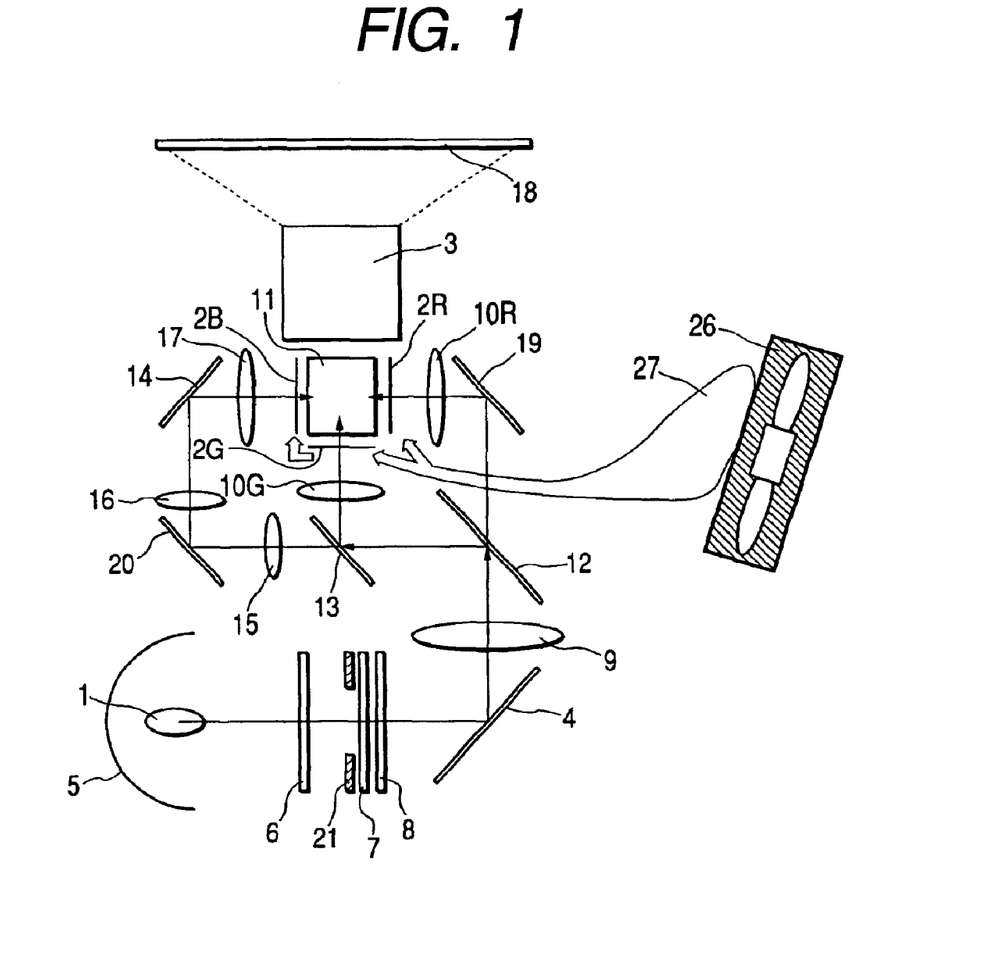
FIG. 1 illustrates a typical configuration of a projection display according to a first embodiment of the present invention.

In FIG. 1, the reference numeral 1 denotes a light source; 2R, 2G, and 2B transmission-type video display devices; 3, a projection lens unit for enlargement projection; 4, 14, 19, and 20, mirrors for reflecting light for an light path change; 5, a reflector having an oval or parabolic reflective surface for reflecting the light emission from the light source; 6, a first array lens which comprises a plurality of small condenser lenses (lens cells) arranged in matrix form and forms a plurality of secondary light source images; 21, a variable aperture which opens bidirectionally to reduce the light beam size; 7, a second array lens which comprises a plurality of small condenser lenses (lens cells) arranged in matrix form, as is the case with the first array lens 6, and forms individual lens images of the first array lens; 8, a polarization changer device which comprises a polarizing beam splitter (not shown) for separating the light from the second array lens 7 into p-polarized light and s-polarized light and emitting them and a ½ wavelength phase difference plate (not shown) for rotating the polarization direction of either p-polarized light or s-polarized light; 9, 10R, and 10G, lenses for condensing; 11, a synthesis prism for color synthesis; 12 and 13, dichroic mirrors for color separation; 15, a first relay lens; 16, a second relay lens; 17, a third relay lens; 18, a screen; 26, a cooling fan; and 27, a cooling air flow path which includes a ventilation duct. Optical devices ranging from the first array lens 6 to the condenser lenses 10R, 10G, 10B constitute an illumination optics for transmission-type video display devices 2R, 2G, and 2B. Transmission-type video display devices 2R, 2G, and 2B use a video signal drive circuit (not shown) to subject the light from the light source 1 to light intensity modulation in accordance with a video signal for the purpose of forming an optical image. In the configuration shown in FIG. 1, the light rays emitted from the light source 1 are collected when they bounce off the reflector 5, and then emitted toward the first array lens 6. The first array lens 6 uses a plurality of lens cells to separate the incident light beam into a plurality of light rays so as to ensure that the resulting light rays efficiently pass through the second array lens 7 and polarization changer device 8. The second array lens 7 allows its plurality of lens cells to project the lens images of the respective lens cells of the first array lens 6 toward transmission-type video display devices 2R, 2G, and 2B. In this instance, the polarization changer device 8 aligns the light rays from the second array lens 7 in a specified polarization direction. The condensing lens 9, condenser lenses 10R and 10G, first relay lens 15, second relay lens 16, and third relay lens 17 position the lens images of all lens cells of the first array lens 6 over video display devices 2R, 2G, and 2B. White light emitted from the light source 1 is emitted from the polarization changer device and reflected by mirror 4. In a sequence in which the white light falls upon video display devices 2R, 2G, and 2B after passing through the condensing lens 9, condenser lenses 10R and 10G, first relay lens 15, second relay lens 16, and third relay lens 17, the dichroic mirrors 12, 13 separate the while light into red light (R light), green light (G light), and blue light (B light), which are then shed upon video display devices 2R, 2G, and 2B, respectively. In the present embodiment, dichroic mirror 12 transmits red light and reflects green light and blue light, whereas dichroic mirror 13 reflects green light and transmits blue light. Video display devices 2R, 2G, and 2B, on which the red, green, and blue lights are shed, modulate the lights with a video signal from the outside to form optical images according to the video signal, and emit the resulting optical images toward the synthesis prism 11 as signal lights. The synthesis prism 11 subjects the signal light of each color to color synthesis and emits the resultant light toward the projection lens unit 3. The projection lens unit 3 enlarges the received white light optical image and projects it onto the screen 18 for image display purposes. In the above configuration in which the optical path of video display device 2B is longer than those of video display devices 2R and 2G, the first relay lens 15, second relay lens 16, and third relay lens 17 also compensate for the difference in the optical path length. Further, condenser lenses 10R and 10G and third relay lens 17 suppress the spread of the light rays after their passage through video display devices 2R, 2G, and 2B, thereby permitting the projection lens unit 3 to achieve enlargement projection with high efficiency. The cooling fan 26 rotates to create a current of air for dissipating heat, which is generated within the projection display when the light emitted from the light source 1 is absorbed, for instance, by video display devices 2R, 2G, and 2B and incoming light polarization plates and outgoing light polarization plates (not shown), which are positioned before or after video display devices 2R, 2G, and 2B. The supply of cooling air to the components to be cooled is provided via the cooling air flow path 27, which includes a ventilation duct (not shown). The amount of light falling upon each video display device and the incidence angle of such light are adjusted by subjecting the light shield of the variable aperture 21 to positional displacement.

In the projection display configured as described above, the variable aperture 21 reduces the size of the light beam emission to an LCD panel 2 to decrease the light beam incidence angle. This results in contrast enhancement.

Figure 2:
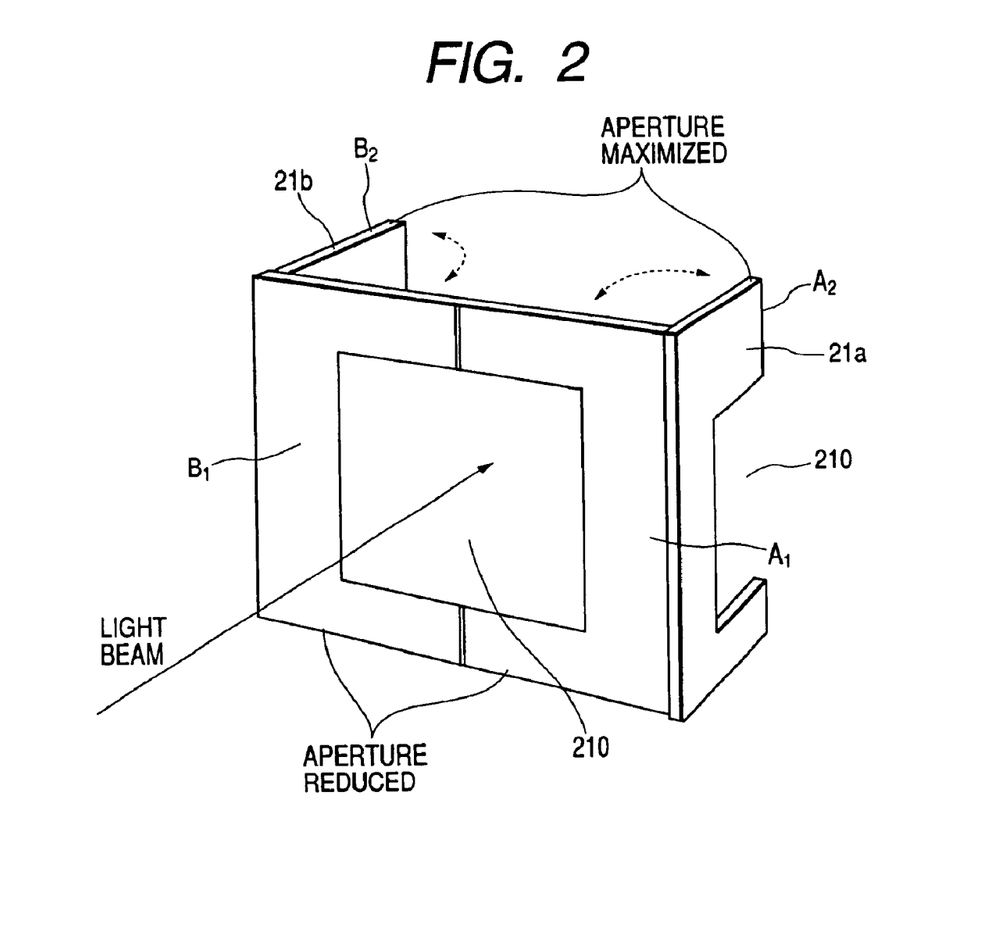
FIG. 2 illustrates a typical configuration of a variable aperture for use in the first embodiment of the present invention.

FIG. 2 illustrates a typical configuration of the variable aperture 21 for use with the projection display shown in FIG. 1.

The variable aperture configuration example shown in FIG. 2 relates to a variable aperture, which bidirectionally opens when two door-shaped light shields revolve around a support axis, suffer positional displacement, and open in the direction of the optical axis. In FIG. 2, the reference numerals 21a and 21b denote the light shields which revolve around the support axis, and the reference numeral 210 denotes a light passage opening, which is formed in the optical path by light passage concaves 21a and 21b. Further, the reference numeral $A_1$ denotes the position of light shield 21a while the light beam size is reduced; $A_2$, the position of light shield 21a while the light beam size is not reduced (the aperture is maximized); $B_1$, the position of light shield 21b while the light beam size is reduced; and $B_2$, the position of light shield 21b while the light beam size is not reduced (the aperture is maximized). In the present embodiment, light shields 21a and 21b of the variable aperture 21 suffer positional displacement to exhibit a first state where light shields 21a and 21b are at positions $A_1$ and $B_1$, respectively, to decrease the light beam size from the periphery and a second state where light shields 21a and 21b are at positions $A_2$ and $B_2$, respectively, to maximize the aperture. In the second state, light shields 21a and 21b are approximately parallel to the light beam and do not block the light beam path. In the first state, on the other hand, light shields 21a and 21b are approximately perpendicular to the light beam so as to block the light beam periphery, and the light passage opening 210 allows the light beam, whose periphery is blocked, to travel toward the video display devices. It is assumed that a motor, solenoid actuator, or the like is used for subjecting light shields 21a and 21b of the variable aperture 21 to positional displacement for an open/close operation, which can be initiated, for instance, by pressing a button. It is also assumed that light shields 21a and 21b are in the second state in a bright operating environment and in the first state in a dark operating environment. In the first state where the light beam size is decreased from the periphery, the amount of light falling on the video display devices is smaller than in the second state where the aperture is maximized. Therefore, the image brightness is lower in the first state than in the second state. However, the image contrast is higher in the first state than in the second state because of a decrease in the angle of the light incident on the video display devices. In an alternative configuration, a photoelectric conversion device such as a phototransistor may be used to detect the operating environment for the purpose of controlling the open/close operation of light shields 21a and 21b of the variable aperture 21 in accordance with the detection results. When, for instance, a predefined amount of light is detected by the photoelectric conversion device in this alternative configuration, the projection display concludes that a bright operating environment is used, and invokes the second state where the aperture is maximized; and when the amount of light detected by the photoelectric conversion device is smaller than predefined, the projection display concludes that a dark operating environment is used, and invokes the first state where the light beam size is decreased from the periphery.

In the embodiment described so far, the employed variable aperture opens bidirectionally as it comprises two door-shaped light shields, which revolve around a support axis, suffer positional displacement, and open in the direction of the optical axis. However, the present invention is not limited to the above configuration. Alternatively, the variable aperture may comprise a mechanism in which the light shield section area varies in a planar manner as in a camera's aperture mechanism. The variable aperture may also comprise an LCD shutter or other electrical light beam block device that applies a voltage higher than a predetermined threshold to a nematic liquid crystal and invokes the first state, in which the light beam size is decreased from the periphery, when the applied voltage is high, and the second state, in which the light beam is not blocked, when the applied voltage is low. It is obvious that the electrical light beam block device is also applicable to the present invention even when its characteristics invoke the first state when the applied voltage is low and the second state when the applied voltage is high.

Figure 3A:
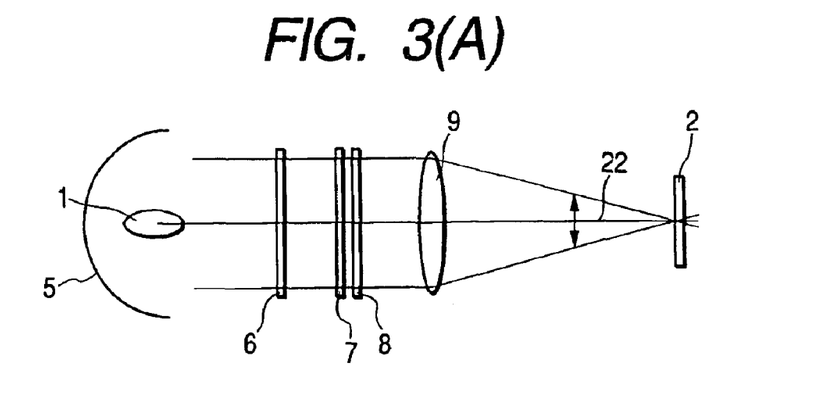
FIGS. 3A and 3B illustrate the operations of a variable aperture according to the first embodiment of the present invention.
Figure 3B:
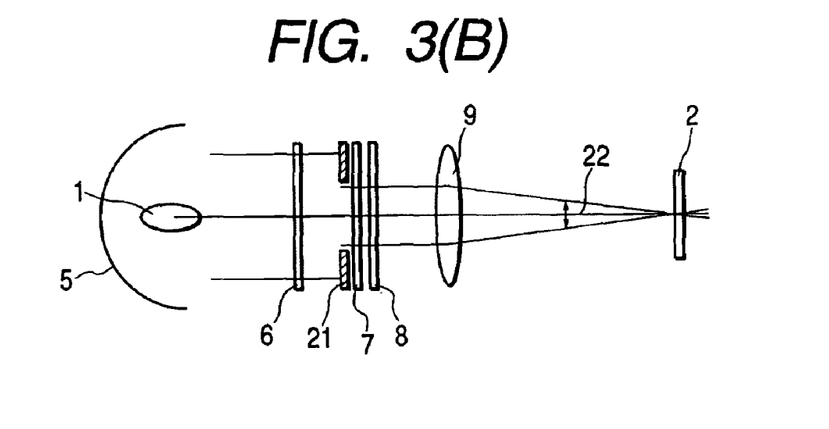

FIGS. 3A and 3B illustrate the operations of the variable aperture within the illumination optics of the projection display shown in FIG. 1. FIG. 3A is a schematic diagram illustrating the second state where the periphery of the light beam is not reduced by the variable aperture 21. FIG. 3B is a schematic diagram illustrating the first state where the periphery of the light beam is reduced by the variable aperture 21.

In the second state shown in FIG. 3A, the light beam falls on a video display device 2 without being reduced in size so that the light incidence angle 22 is relatively great. Therefore, the resulting image contrast value corresponds to such a relative great incidence angle. In the first state, on the other hand, the size of the light beam falling on the video display device 2 is decreased from the periphery so that the light incidence angle 22 is smaller than in the second state. Therefore, the resulting image contrast value increases in accordance with such a decrease in the light incidence angle. In the present embodiment, control can be exercised to switch between the first and second states in accordance with the operating environment.

Figure 4:
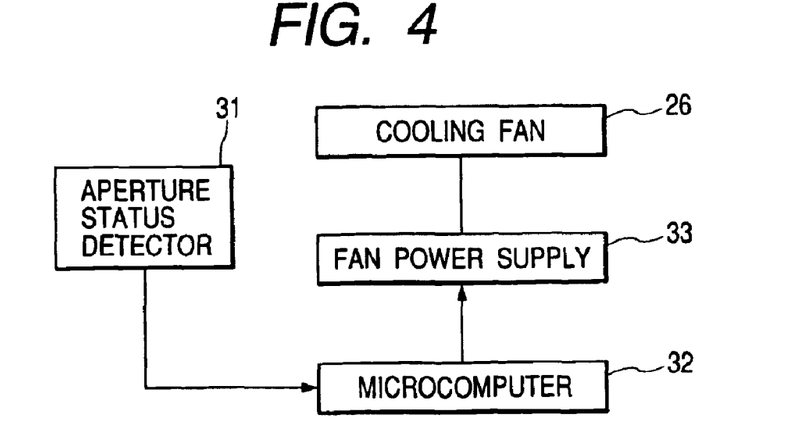
FIG. 4 is a block diagram that illustrates the control of a cooling fan revolving speed according to the status of an aperture.

FIG. 4 is a block diagram that illustrates how the cooling system of the projection display shown in FIG. 1 is controlled.

In FIG. 4, the reference numeral 26 denotes a cooling fan; 33, a fan power supply for driving the cooling fan 26; 31, an aperture status detector which uses a mechanical switch or the like to detect how the light beam size is reduced by light shields 21a and 21b of the variable aperture 21; 32, a microcomputer which serves as a control means for deriving a control signal from an output signal from the aperture status detector 31 and controlling the revolution of the cooling fan 26 via the fan power supply 33 in accordance with the control signal. The fan power supply 33 has at least two different supply voltages to be applied to the cooling fan 26. When a high voltage is applied to the cooling fan 26 in accordance with a control signal from the microcomputer 32, the cooling fan 26 increases its revolving speed. When a low voltage is applied, on the other hand, the cooling fan 26 decreases its revolving speed. In the first state where the light beam size is reduced by light shields 21a and 21b of the variable aperture 21, the microcomputer 32 controls the fan power supply 33 so as to apply a low voltage to the cooling fan 26. In the second state where the light beam size is not reduced by light shields 21a and 21b of the variable aperture 21, the microcomputer 32 controls the fan power supply 33 so as to apply a high voltage to the cooling fan 26. The aperture status detector 31 may alternatively detect the amount of positional displacement or updated position of light shields 21a and 21b of the variable aperture 21 for the purpose of detecting how the light beam size is reduced. As another alternative, the aperture status detector 31 may derive a detection signal from an output signal generated by a motor, solenoid actuator, or other component for driving light shields 21a and 21b. Some other detection method may also be used. As an alternative to exercising revolution control of the cooling fan 26 via the fan power supply 33, the drive circuit for the cooling fan 26 may be directly controlled. The configuration for detecting the degree of light beam size reduction has been described in conjunction with the present embodiment. However, the present invention is not limited to the above configuration. In an alternative configuration, an operating control button may be pressed to set a variable aperture open/close operation in accordance with the operating environment while controlling the cooling fan revolving speed in accordance with a selected variable aperture state.

As described above, a single projection display configured according to the present embodiment makes it possible to adjust the brightness and contrast for a bright, dark, or other operating environment by changing the brightness and contrast in a coordinated manner. If, for instance, the image brightness is an essential concern in a bright or other operating environment, a bright image can be obtained by maximizing the variable aperture. If, on the contrary, brightness reduction is permissible in a dark or other operating environment, a high-contrast image can be displayed by reducing the light beam size. When the light beam size is reduced, the degree of temperature rise decreases because the amount of light beam passage is smaller in the light emission section than in the variable aperture. This suppresses heat generation and temperature rise within the projection display. Further, since at least the cooling fan revolving speed can be controlled in accordance with a variation caused by a brightness changeover, the cooling fan revolving speed can be reduced as the degree of heat generation and temperature rise within the projection display is relatively small while the projection display is used with the brightness decreased. This results in a decrease in the amount of both noise generation and power consumption.

Figure 5:
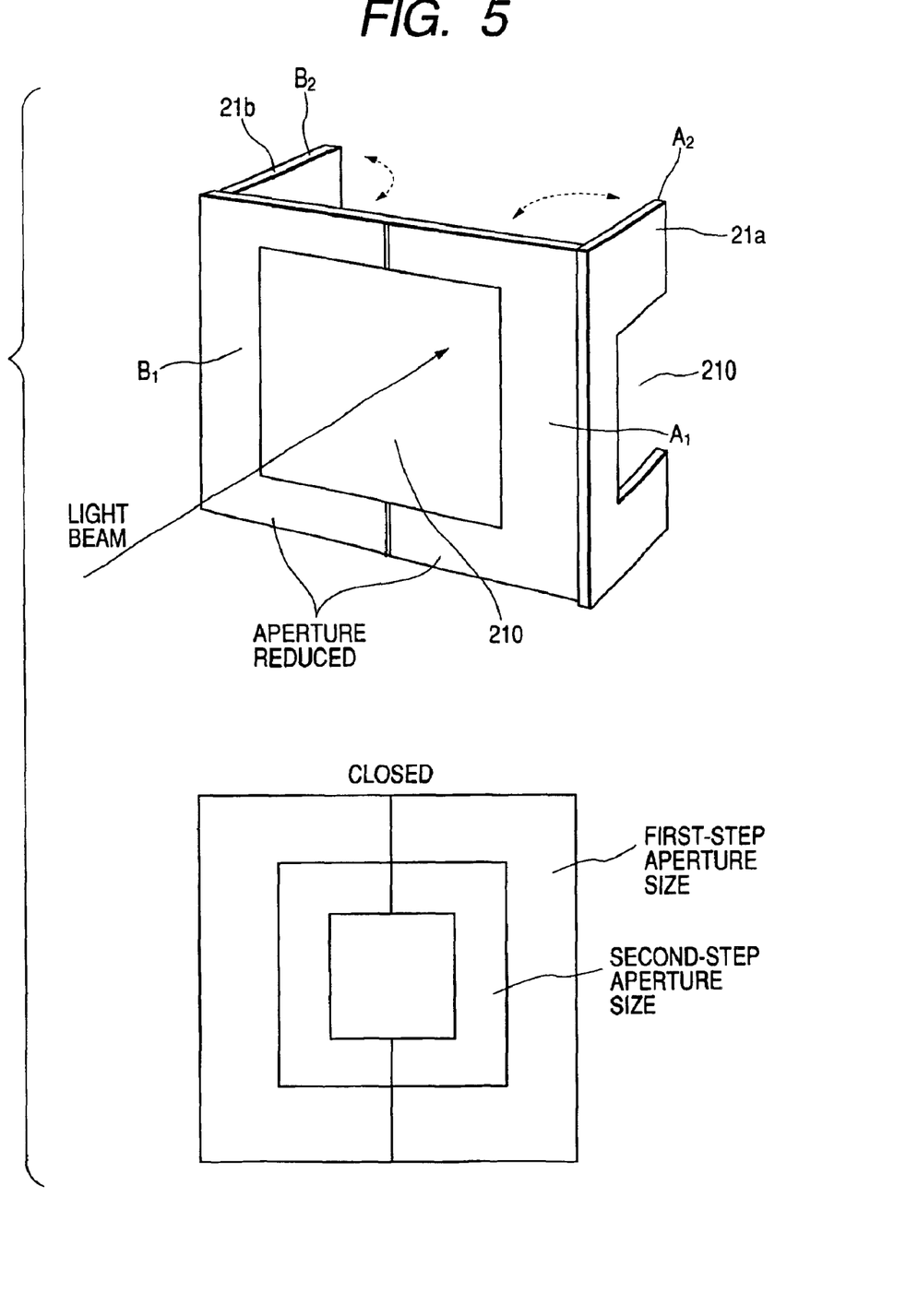
FIG. 5 illustrates a typical configuration of a variable aperture for use in a second embodiment of the present invention.

FIG. 5 illustrates the variable aperture 21 for use in a second embodiment of the present invention.

The second embodiment differs from the first embodiment in that the variable aperture has two door-shaped aperture diaphragms, which differ in the opening area. Therefore, when the openings of the aperture diaphragms are sequentially reduced, the aperture adjustment effect can be produced in two steps. The variable aperture according to the present embodiment is not limited to the above. It is obvious that the variable aperture may comprise three or more door-shaped aperture diaphragms.

Figure 6:
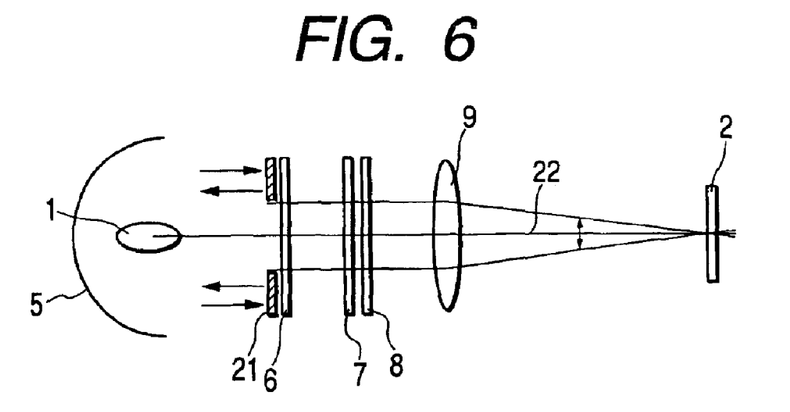
FIG. 6 illustrates the operation that is performed according to a third embodiment of the present invention.

FIG. 6 illustrates a third embodiment of the present invention.

The third embodiment differs from the first embodiment in that the variable aperture 21 is positioned between a group of array lenses and the light source. The reflector used as the light source is shaped like a paraboloid of revolution. Upon receipt of light rays from a lamp bulb, the reflector emits light rays that are approximately parallel to each other. If the incident light rays are parallel to each other as is the case with the outgoing light, such light rays return to the lamp bulb. The light rays then penetrate through the lamp bulb, bounce off the reflector surface again, and travel forward. The variable aperture positioned before the first array lens is made of a highly reflective, highly flat material. The light rays blocked by the variable aperture are reflected and returned toward the light source. The returning light rays bounce off the parabolic reflector again and travel forward. Therefore, the light rays can be effectively used instead of letting them discarded by the variable aperture. This prevents the variable aperture from decreasing the brightness. Since the reflectivity of the variable aperture is raised, the brightness is increased by 3%.

Alternatively, the variable aperture may be positioned, for instance, between the second array lens and the polarization changer device or between the polarization changer device and the condensing lens.

Figure 7:
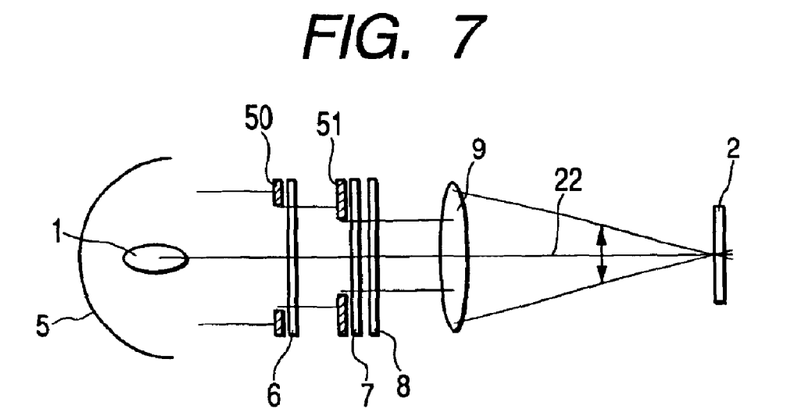
FIG. 7 illustrates the operation that is performed according to a fourth embodiment of the present invention.

FIG. 7 illustrates a fourth embodiment of the present invention.

The fourth embodiment differs from the first embodiment in that two variable aperture are separately installed. In FIG. 7, the reference numeral 50 denotes a first variable aperture, which is positioned before the first array lens. The reference numeral 51 denotes a second variable aperture, which is positioned before the second array lens. The second variable aperture 51 has a smaller opening area than the first variable aperture 50. When the first and second variable apertures are sequentially reduced, the aperture adjustment effect can be produced in two steps. Even if the two variable apertures are not separately reduced, the heat generated by light rays absorbed by a variable aperture can be dissipated to two places. This makes it possible to avoid extreme heat generation at one place. As a result, the scheme for projection display cooling can be simplified.

As a fifth embodiment of the present invention, the shape of a variable aperture will now be described. The variable aperture of the present embodiment enhances the contrast with the decrease in the brightness minimized by making use of the "contrast's visibility angle characteristic" in which the contrast performance varies with the incidence direction even when the angle of light beam incidence on an LCD panel remains unchanged.

Figure 8:
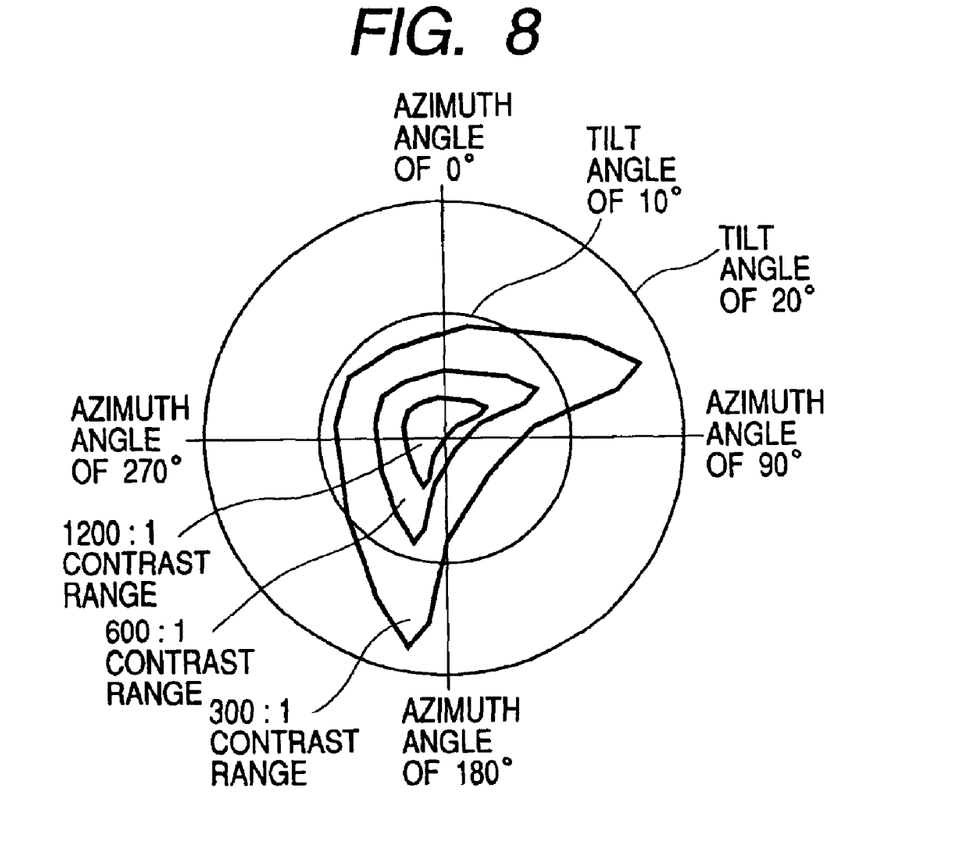
FIG. 8 illustrates the visibility angle characteristic of the contrast provided by a video display device.

FIG. 8 shows an example of a visibility angle characteristic of the contrast provided by an ordinary LCD panel. In this figure, the contrast is plotted with a single incident light beam's tilt angle from the normal to an LCD panel surface and the azimuth angle of the light ray tilt handled as parameters. This example indicates that the LCD panel's contrast relative to the light beam incidence angle is not determined by the light beam tilt angle alone but is largely dependent on the azimuth angle. When, for instance, light beams having the same tilt angle of 10 degrees are compared, the example reveals that a great contrast value difference lies between the incidence from right and above and onto the paper surface in FIG. 8 (at an azimuth angle of 45 degrees) and the incidence from right and below and onto the paper surface in FIG. 8 (at an azimuth angle of 135 degrees).

In a real projection display, a beam of light rays varying in the incidence angle falls the LCD panel. It means that the contrast of the projection display is the total contrast of all light rays. Therefore, when light rays having a poor-contrast azimuth angle are preferentially blocked by a variable aperture, the contrast effectively improves.

Figure 9:
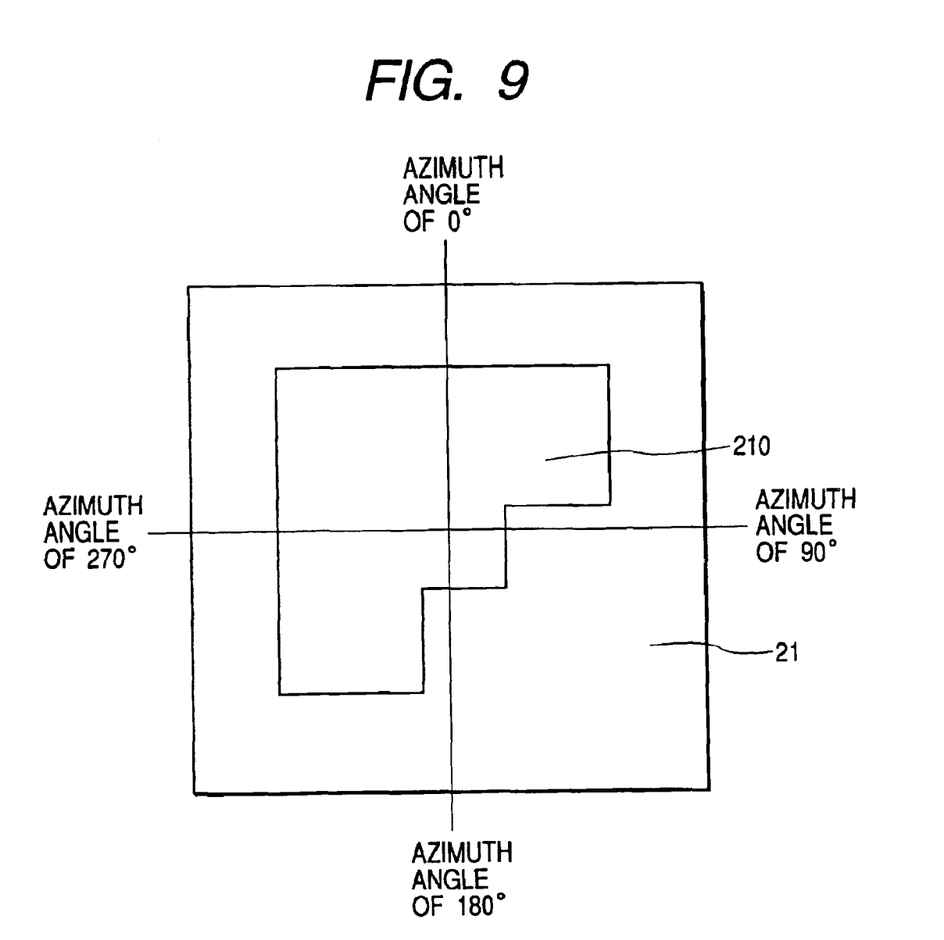
FIG. 9 illustrates a fifth embodiment of the present invention.
Figure 10:
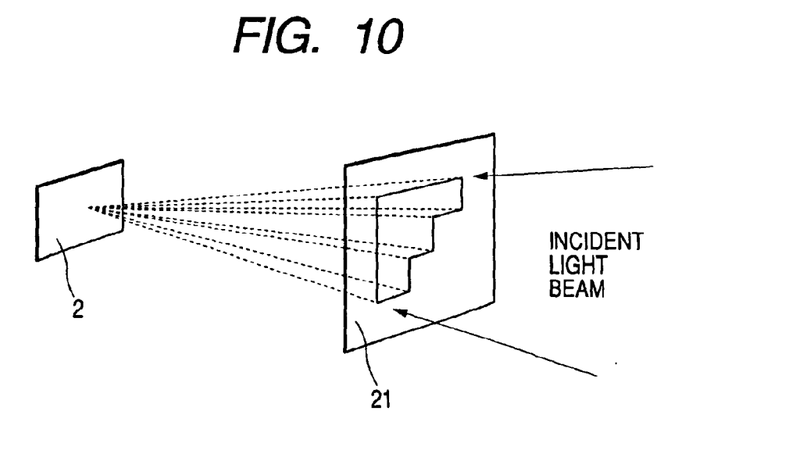
FIG. 10 illustrates the incidence of light rays on a video display device.

FIG. 9 shows the shape of a variable aperture of the present embodiment. The variable aperture 21 of the present invention shown in FIG. 9 is for an LCD panel having the visibility angle characteristic depicted in FIG. 8. It is shaped to block light rays in the lower right-hand area of the paper surface shown in FIG. 9, that is, poor-contrast light rays having an approximate azimuth angle of 90 to 180 degrees as shown in FIG. 8. Therefore, the contrast can be enhanced while providing a smaller amount of light beam blocking than in a conventional case where light beam blocking is provided around the optical axis and symmetrically with respect to the axis, that is, while reducing the decrease in the brightness. FIG. 10 illustrates how a light beam, which is partly blocked by the variable aperture according to the present embodiment, is incident on the LCD panel. The incident light beam exhibits an angular distribution that corresponds to the visibility angle characteristic of the LCD panel, thereby indicating that the contrast is efficiently improved.

When a projection display having a luminous flux of 1200 lm and a contrast of 400:1, which corresponds to FIG. 3A, employs a variable aperture shaped as indicated in FIG. 9 according to the present invention as the variable aperture 21 shown in FIG. 3B, a contrast of 700:1 can be achieved at a luminous flux of 900 lm. If the variable aperture is shaped like a simple rectangle, which has been conventionally adopted, and not shaped according to the visibility angle characteristic of the LCD panel, a contrast of 700:1 cannot be achieved until the aperture is reduced to provide a luminous flux of 700 lm.

In the present embodiment described above, the shape of the variable aperture is neither top-bottom symmetrical nor left-right symmetrical. However, the shape of the variable aperture should be determined according to the visibility angle characteristic of the LCD panel. In any case, it is needless to say that the shape of the variable aperture is asymmetrical with respect to the optical axis.

Figure 11:
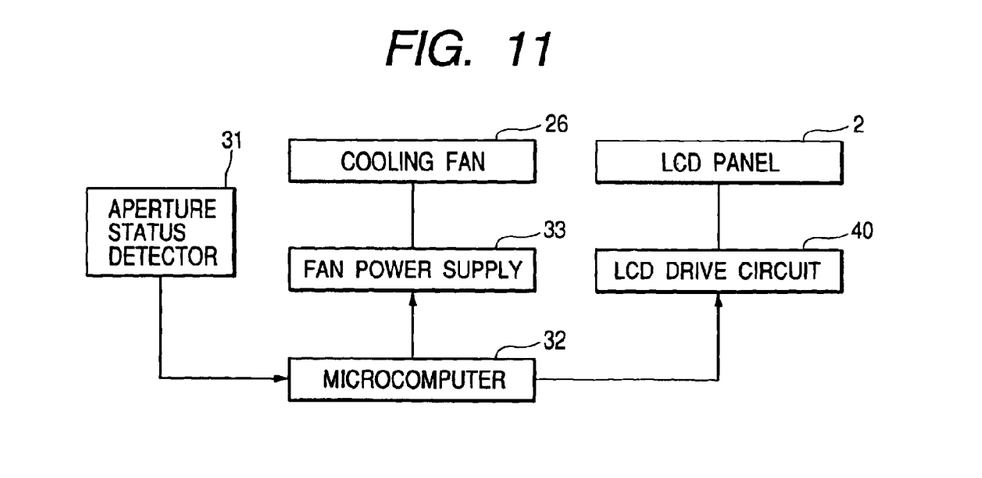
FIG. 11 is a block diagram that illustrates the control of a video display device's color temperature adjustment value and gamma adjustment value according to the status of a variable aperture for use in a sixth embodiment of the present invention.

FIG. 11 is a block diagram illustrating a sixth embodiment of the present invention.

In the sixth embodiment, a variable aperture configured the same as described for use in the first embodiment is installed, and the revolving speed of the cooling fan in the cooling system is varied depending on whether the light beam is blocked by the open/close positional displacement of the light shields for the variable aperture while the electrical characteristics adjustments are made of the video display devices, including color temperature characteristic (white balance), gamma characteristic, and color irregularity corrections. In general, LCD panels and other video display devices have a nonlinear v-t characteristic (voltage-transmittance characteristic). For example, the drive circuitry for driving the video display devices makes adjustments so as to provide prescribed color temperature characteristic, gamma characteristic, and color irregularity corrections. Electrical characteristics adjustment values vary with the amount of light incident on an LCD panel or other video display device and the angle of such incidence.

In FIG. 11, the reference numeral 2 denotes an LCD panel or other video display device, whereas the reference numeral 40 denotes a drive circuit for driving the video display device 2. For the drive circuit 40, color temperature characteristic adjustment values and gamma characteristic adjustment values appropriate for various degrees of light beam reduction by the variable aperture are preset. The reference numeral 26 denotes a cooling fan; 33, a fan power supply for driving the cooling fan 26; 31, an aperture status detector for detecting how the light beam size is reduced by light shields 21a and 21b of the variable aperture 21; and 32, a microcomputer which serves as a control means for deriving a control signal from an output signal from the aperture status detector 31, controlling the revolution of the cooling fan 26 via the fan power supply 33 in accordance with the control signal, and makes electrical characteristics adjustments of the video display device 2, including color temperature characteristic, gamma characteristic, and color irregularity corrections. In the sixth embodiment, too, the fan power supply 33 has at least two different supply voltages to be applied to the cooling fan 26. When a high voltage is applied to the cooling fan 26 in accordance with a control signal from the microcomputer 32, the cooling fan 26 increases its revolving speed. When a low voltage is applied, on the other hand, the cooling fan 26 decreases its revolving speed. In the first state where the light beam size is reduced by light shields 21a and 21b of the variable aperture 21, the microcomputer 32 controls the fan power supply 33 so as to apply a low voltage to the cooling fan 26, and controls the drive circuit so that the electrical characteristics of the video display device 2 match the amount of light or incidence angle prevailing in the first state. In the second state where the light beam size is not reduced by light shields 21a and 21b of the variable aperture 21, the microcomputer 32 controls the fan power supply 33 so as to apply a high voltage to the cooling fan 26, and controls the drive circuit so that the electrical characteristics of the video display device 2 match the amount of light or incidence angle prevailing in the second state. As is the case with the first embodiment, the aperture status detector 31 may alternatively detect the amount of positional displacement or updated position of light shields 21a and 21b of the variable aperture 21 for the purpose of detecting how the light beam size is reduced. As another alternative, the aperture status detector 31 may derive a detection signal from an output signal generated by a motor, solenoid actuator, or other component for driving light shields 21a and 21b. Some other detection method may also be used. As an alternative to exercising revolution control of the cooling fan 26 via the fan power supply 33, the drive circuit for the cooling fan 26 may be directly controlled.

As is the cases with the first embodiment, the projection display configured according to the sixth embodiment makes it possible to adjust the brightness and contrast for a bright, dark, or other operating environment by changing the brightness and contrast in a coordinated manner. If, for instance, the image brightness is an essential concern in a bright or other operating environment, a bright image can be projected by maximizing the variable aperture. If, on the contrary, brightness reduction is permissible in a dark or other operating environment, a high-contrast image can be displayed by reducing the light beam size. When the light beam size is reduced, the degree of temperature rise decreases because the amount of light is smaller in the light emission section than in the variable aperture. This suppresses a temperature rise within the projection display. Further, since at least the cooling fan revolving speed can be controlled in accordance with a variation caused by a brightness changeover, the cooling fan revolving speed can be reduced as the degree of heat generation and temperature rise within the projection display is relatively small while the projection display is used with the brightness decreased. This results in a decrease in the amount of both noise generation and power consumption. Further, the video display device can be set for a color temperature adjustment value and gamma adjustment value appropriate for the degree of light beam size reduction. This feature makes it possible to achieve image quality appropriate for the degree of light beam size reduction.

The present invention is not limited to the above embodiments in which a transmission-type video display device is used. A reflection-type video display device may alternatively be used with the present invention. The configuration employed for the sixth embodiment controls both the revolving speed of the cooling fan and the adjustment value settings for the video display device's electrical characteristics in accordance with the degree of light beam size reduction. However, an alternative configuration may be employed so as to control only the adjustment value settings for the video display device's electrical characteristics.

What is claimed is:

1. A projection display, comprising:
   a light source unit which comprises a light source and a reflector;
   an illumination optics unit for converting a light beam emission from said light source unit into approximately parallel light rays;
   a video display device for generating an optical image by modulating a light beam emission from said illumination optics unit in accordance with a video signal;
   a projection unit for projecting image light which is received from said video display device; and
   a plurality of variable apertures comprising at least a first variable aperture and a second variable aperture, each of which has at least a first state in which the light beam emission is blocked in accordance with the visibility angle characteristic of said video display device and a second state in which the aperture is maximized;
   wherein:
   said first variable aperture being first in order followed by said second variable aperture, relative to a direction of said light beam emission from said light source unit, and
   said first variable aperture has a larger opening area than said second variable aperture.

2. The projection display according claim 1, wherein said illumination optics unit comprises an array lens group which comprises a first array lens and a second array lens, a polarization changer device for aligning light rays in a specified polarization direction, and a condensing lens for condensing light rays, and wherein said first variable aperture is positioned at a location between said light source unit and said first array lens, and comprises reflection mirror for reflecting light rays from said light source unit.

3. The projection display according to claim 1, further comprising:
   an aperture status detector which detects the status of said variable aperture; and a cooling fan for cooling the interior of said projection display;

wherein the revolving speed of said cooling fan is controlled in accordance with the results of detection by said aperture status detector.

4. The projection display according to claim 3, wherein said cooling fan is controlled to increase the revolving speed when said variable aperture is maximized and decrease the revolving speed when said variable aperture is reduced.

5. The projection display according to claim 1, further comprising:

an aperture status setting unit which sets the status of said variable aperture; and a cooling fan for cooling the interior of said projection display;

wherein the revolving speed of said cooling fan is controlled in accordance with a setting selected by said aperture status setting unit.

6. The projection display according to claim 5, wherein said cooling fan is controlled to increase the revolving speed when said variable aperture is maximized and decrease the revolving speed when said variable aperture is reduced.

7. A projection display comprising:

a light source unit which comprises a light source and a reflector;

an illumination optics unit for converting a light beam emission from said light source unit into approximately parallel light rays, comprising an array lens group which comprises a first array lens and a second array lens, a polarization changer device for aligning light rays in a specified polarization direction, and a condensing lens for condensing light rays;

a video display device for generating an optical image by modulating a light beam emission from said illumination optics unit in accordance with a video signal;

a projection unit for projecting image light which is received from said video display device; and a plurality of variable apertures comprising at least a first variable aperture and a second variable aperture, each of which has at least a first state in which the light beam emission is blocked in accordance with a visibility angle characteristic of said video display device and a second state in which the aperture is maximized; wherein:

said plurality of variable apertures are positioned at a plurality of different locations between said light source unit and said first array lens, between said first array lens and said second array lens, between said second array lens and said polarization changer device, or between said polarization changer device and said condensing lens, said first variable aperture being first in order followed by said second variable aperture, relative to a direction of said light beam emission from said light source unit, and said first variable aperture has a larger opening area than said second variable aperture.

8. The projection display according to claim 7, wherein said variable aperture lies between said light source unit and said first array lens, and comprises a reflection mirror for reflecting light rays from said light source unit.

9. The projection display according to claim 7, further comprising:

an aperture status detector which detects the status of said variable aperture; and a cooling fan for cooling the interior of said projection display;

wherein the revolving speed of said cooling fan is controlled in accordance with the results of detection by said aperture status detector.

10. The projection display according to claim 9, wherein said cooling fan is controlled to increase the revolving speed when said variable aperture is maximized and decrease the revolving speed when said variable aperture is reduced.

11. The projection display according to claim 7, further comprising:

an aperture status setting unit which sets the status of said variable aperture; and a cooling fan for cooling the interior of said projection display;

wherein the revolving speed of said cooling fan is controlled in accordance with a setting selected by said aperture status setting unit.

12. The projection display according to claim 11, wherein said cooling fan is controlled to increase the revolving speed when said variable aperture is maximized and decrease the revolving speed when said variable aperture is reduced.

13. A projection display, comprising:

a light source unit which comprises a light source and a reflector;

an illumination optics unit for converting a light beam emission from said light source unit into approximately parallel light rays, comprising an array lens group which comprises a first array lens and a second array lens, a polarization changer device for aligning light rays in a specified polarization direction, and a condensing lens for condensing light rays;

a video display device for generating an optical image by modulating a light beam emission from said illumination optics unit in accordance with a video signal;

a projection unit for projecting image light which is received from said video display device; and a variable aperture having at least a first state in which the light beam emission is blocked in accordance with the visibility angle characteristic of said video display device and a second state in which the aperture is maximized;

wherein said variable aperture is positioned at a location between said light source unit and said first array lens, and comprises a reflection mirror for reflecting light rays from said light source unit.

14. The projection display according to claim 13, wherein in said variable aperture, the shape of the opening area of said first state is formed in accordance with the visibility angle characteristic of said video display device.

15. The projection display according to claim 13, further comprising:

an aperture status detector which detects the status of said variable aperture; and a cooling fan for cooling the interior of said projection display;

wherein the revolving speed of said cooling fan is controlled in accordance with the results of detection by said aperture status detector.

16. The projection display according to claim 15, wherein said cooling fan is controlled to increase the revolving speed when said variable aperture is maximized and decrease the revolving speed when said variable aperture is reduced.

17. The projection display according to claim 13, further comprising:

an aperture status setting unit which sets the status of said variable aperture; and a cooling fan for cooling the interior of said projection display;

wherein the revolving speed of said cooling fan is controlled in accordance with a setting selected by said aperture status setting unit.

18. The projection display according to claim 17, wherein said cooling fan is controlled to increase the revolving speed when said variable aperture is maximized and decrease the revolving speed when said variable aperture is reduced.

19. A projection display, comprising:

a light source unit which comprises a light source and a reflector;

an illumination optics unit for converting a light beam emission from said light source unit into approximately parallel light rays, comprising an array lens group which comprises a first array lens and a second array lens;

a video display device for generating an optical image by modulating a light beam emission from said illumination optics unit in accordance with a video signal;

a projection unit for projecting image light which is received from said video display device; and a plurality of variable apertures comprising at least a first variable aperture and a second variable aperture, each of which has at least a first state in which the light beam emission is blocked in accordance with the visibility angle characteristic of said video display device and a second state in which the aperture is maximized, and making a plurality of image brightness/contrast combinations selectable;

wherein said first variable aperture is positioned between said light source unit and said first array lens, and said second variable aperture is positioned between said first array lens and, said second array lens, and further said first variable aperture has a larger opening area than said second variable aperture.

* * * * *